United States Patent
Corts (10) Patent No.: US 8,584,500 B2
(45) Date of Patent: *Nov. 19, 2013

(54) LUBRICATION DELIVERY SYSTEM FOR LINEAR BEARINGS

(75) Inventor: Jochen Corts, Remscheid (DE)

(73) Assignee: CORTS Engineering GmbH & Co. KG, Remscheid (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,535

(22) Filed: Jul. 2, 2012

(65) Prior Publication Data

US 2012/0312063 A1   Dec. 13, 2012

Related U.S. Application Data

(63) Continuation of application No. 12/263,308, filed on Oct. 31, 2008, now Pat. No. 8,210,012.

(60) Provisional application No. 60/984,360, filed on Oct. 31, 2007.

(51) Int. Cl.
   B21B 27/06   (2006.01)

(52) U.S. Cl.
   USPC .................................................. 72/236; 72/43

(58) Field of Classification Search
   USPC ...................... 72/43, 44, 236, 5, 6.14, 7.3, 7.4
   See application file for complete search history.

(56) References Cited

U.S. PATENT DOCUMENTS 3,076,524 A * 2/1963 Avallone et al. ............... 184/7.4
4,238,947 A * 12/1980 Graham et al. ................. 72/237

* cited by examiner

*Primary Examiner* — Dana Ross
*Assistant Examiner* — Matthew G Katcoff
(74) *Attorney, Agent, or Firm* — Briggs and Morgan, P.A.; John F. Klos; Audrey J. Babcock (57) ABSTRACT

A lubrication delivery system for a rolling facility having a plurality of roll stands. A centralized lubrication source is arranged to supply lubrication to a plurality of liners within the roll stands during a rolling campaign. The lubrication source can supply one or more lubricants via controlled conduits in fluid communication with the liners. Liners are provided with a plurality of conduits for directing pressurized lubricant from the centralized lubricant source so as to minimize lubricant loss. A plurality of different lubricants may be provided at a centralized source with a controller or other device directing a flow of pressurized lubricant to the plurality of roll stands during the campaign.

17 Claims, 15 Drawing Sheets

LUBRICATION DELIVERY SYSTEM FOR LINEAR BEARINGS

RELATED APPLICATIONS

This application is a continuation of U.S. patent application Ser. No. 12/263,308, filed Oct. 31, 2008, which claims the benefit of priority of U.S. Provisional Patent Application No. 60/984,360, filed Oct. 31, 2007, which applications are each hereby incorporated by reference in their entireties.

BACKGROUND OF THE INVENTION

Linear bearings or liners have been used to provide a flat guiding module or plate-type bearing elements for rolling stand frames. These bearings typically have at least one slide-bearing surface in contact with another bearing surface and are particularly prone to wear and tear within the hostile rolling environment. Versions of linear bearings are disclosed in PCT applications, PCT/EP02/03010 and PCT/EP03/014573, each document being incorporated by reference herein.

To obtain precisely rolled products, all clearances throughout the rolling system must be evaluated and held to tightest possible tolerances. Failure to maintain bearing clearances results in a substantial economic reduction of the product, increased maintenance costs, excessive component wear, and other dangerous conditions.

It has been recognized that bearing wear is often determined by outside influences and mechanical effects such as abrasion, chamfer wear and wear of mounting surfaces. Abrasion may result from scale and abrasive particles, severely worn bearing surfaces from any relative movement between chock and housing, corrosion and localized overloads. Chamfer wear may result in damaged chamfers, reduced bearing surface area, imprecise guidance during chock loading, and open passages for water and abrasive particles. Corrosion (or erosion) may be caused by cooling water chemicals, high pressure descaling water and shimming. Corrosion may result in washed out lubrication, increased humidity, fretting defects and pop-outs of liner material. Wear of liners may result from heavy impact loads, such as hammering, localized overloads and corrosion/erosion.

SUMMARY OF THE INVENTION

Addressing the deficiencies of the conventional art, embodiments in accordance with the present invention resolve many linear bearing problems in an efficient, cost effective manner. The present invention relates to an efficient lubrication system incorporating a liner plate having a plurality of lubricant conduits and apertures and an apparatus for delivering lubricant to the plates. The system may include a centralized lubricant source or a plurality of discrete lubricant sources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the accompanying drawings which form part of the specification and wherein like numerals and letters refer to like parts wherever they occur.

DETAILED DESCRIPTION OF THE INVENTION

Figure 1:
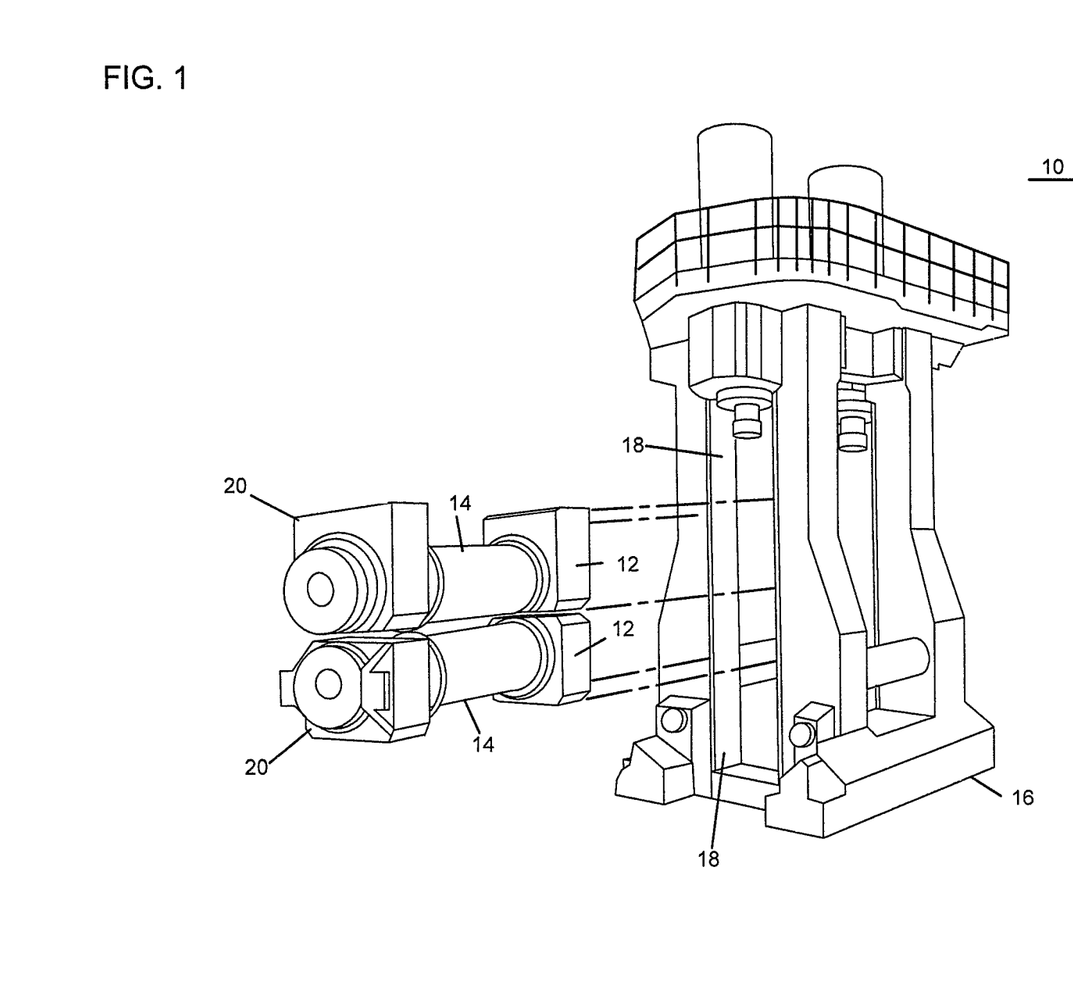
FIG. 1 is a perspective illustration of a mill stand and related components.

FIG. 1 provides a perspective view of a mill stand 10 incorporating linear bearings (or "liners") 12, with the pair of working rolls 14 and chock set 15 depicted in a removed state relative to the mill stand (or "roll stand") housing 16. During use, the linear bearings 12 engage linear bearings 18 attached to the roll stand housing 16 to limit movement of the rolls 14 to a generally horizontal direction. The bearings 18 include lubricant ports supplied via a lubrication delivery system as described in additional detail herein. Embodiments of linear bearings 16, 18 are disclosed in PCT applications, PCT/EP02/03010 and PCT/EP03/014573, each document being incorporated by reference herein. Additional linear bearings adaptable for use within a system in accordance with the present invention may be provided by Josua CORTS Sohn, Bearing Technology Division, of Remscheid DE.

Figure 2A:
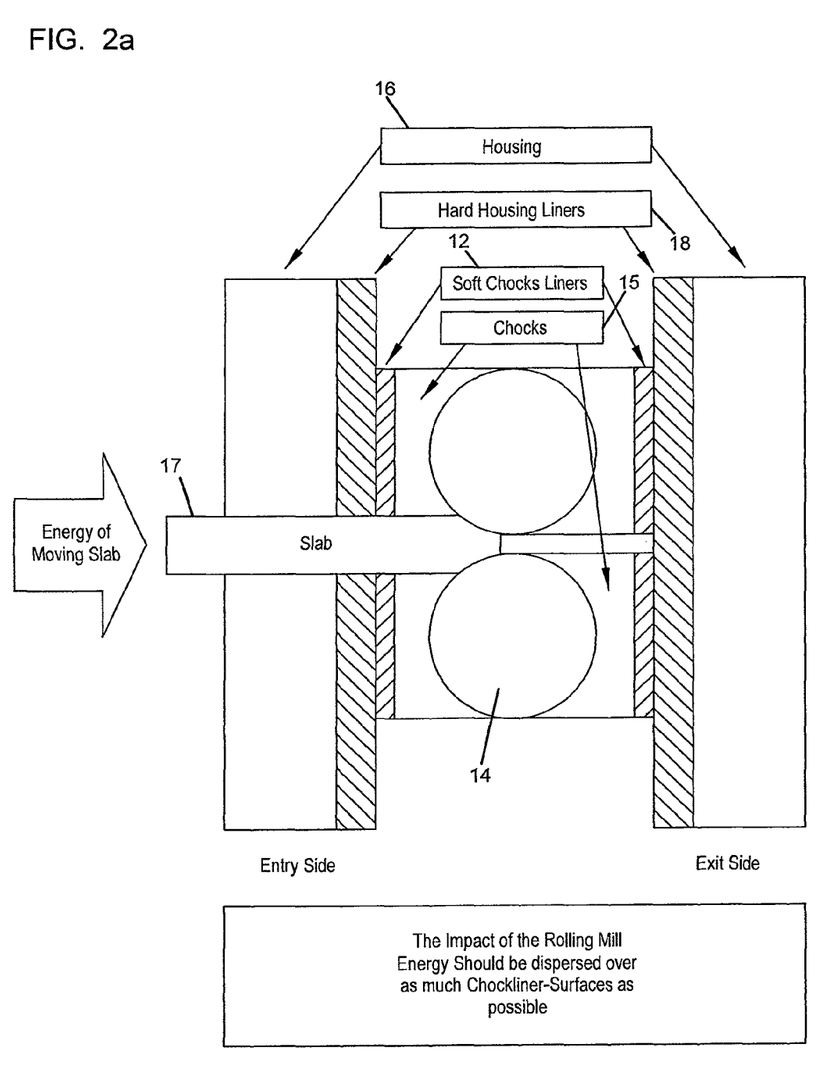
FIG. 2 is a depiction of a mill stand in a non-worn condition.

FIG. 2a provides a side elevational view depiction of a mill stand incorporating linear bearings. The mill stand of FIG. 2a depicts components in relatively new, unworn condition. The mill roll is held between mill stand sides by chocks 14 and liner pairs 16. The chocks and chock liners move vertically during operation with the chock liners being in sliding contact with the housing liners. As depicted, slab product 17 moves through roll stand 16. In such a condition, the impact of the rolling mill energy is dispersed across a substantial portion of the chock liner surfaces.

Figure 2B:
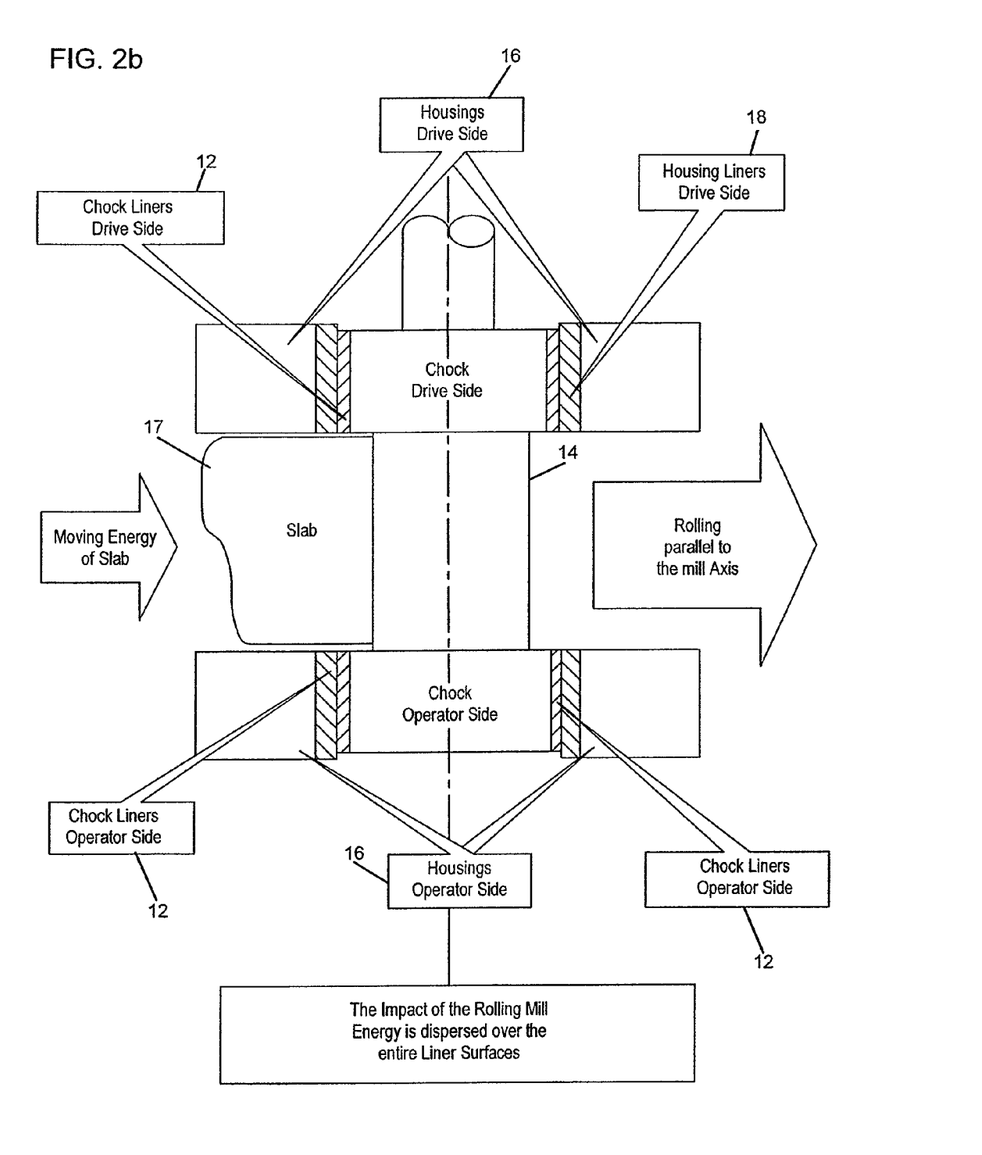

FIG. 2*b* is a top elevational view depiction of the mill stand of FIG. 2*a*. The direction of slab movement is illustrated by the arrows. FIG. 2*b* illustrates a mill stand in optimum condition, where the impact of the slab into the mill stand is dispersed throughout the liner surfaces.

Figure 3A:
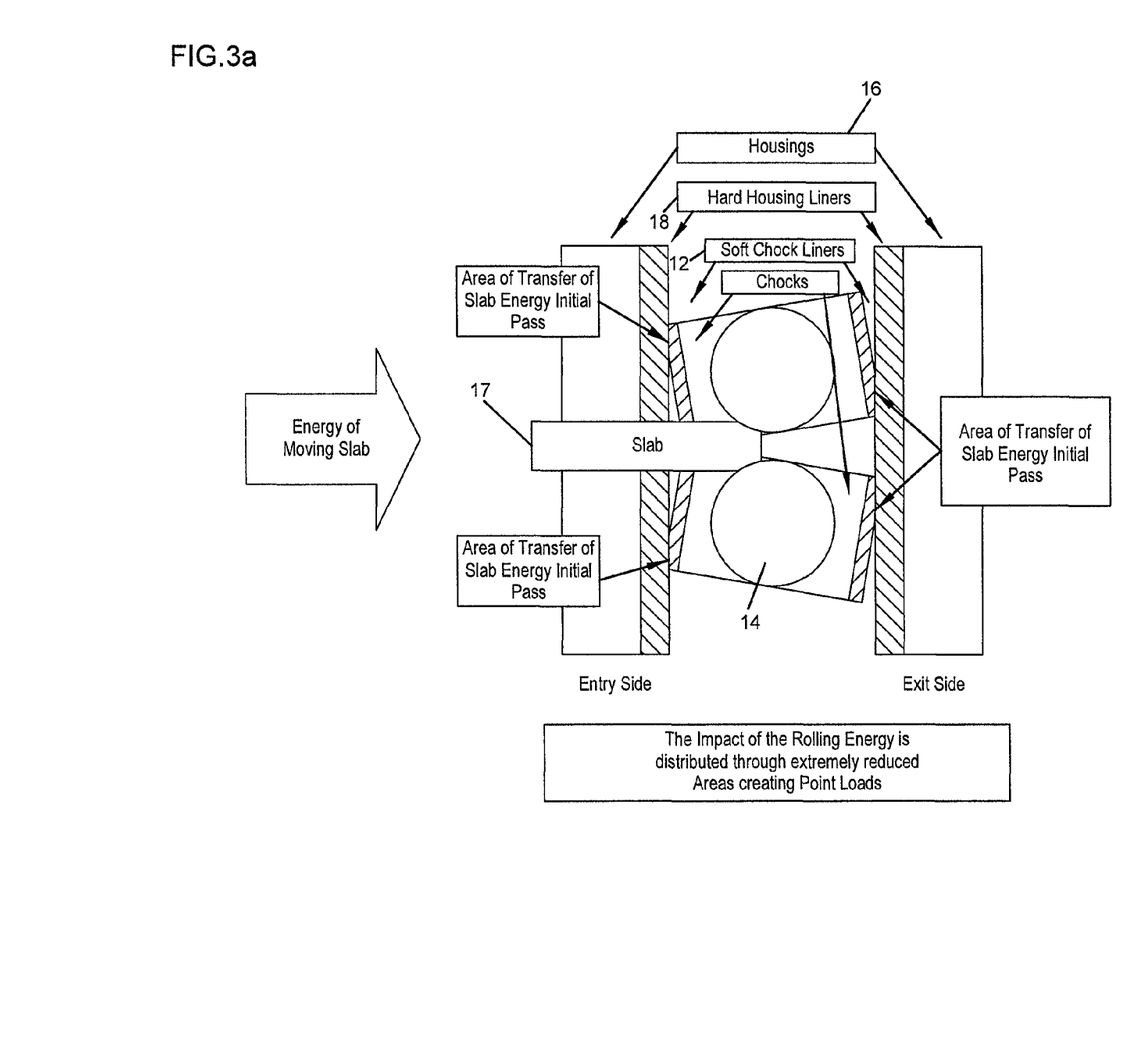
FIG. 3 is a depiction of the mill stand of FIG. 2 in a worn condition.
Figure 3B:
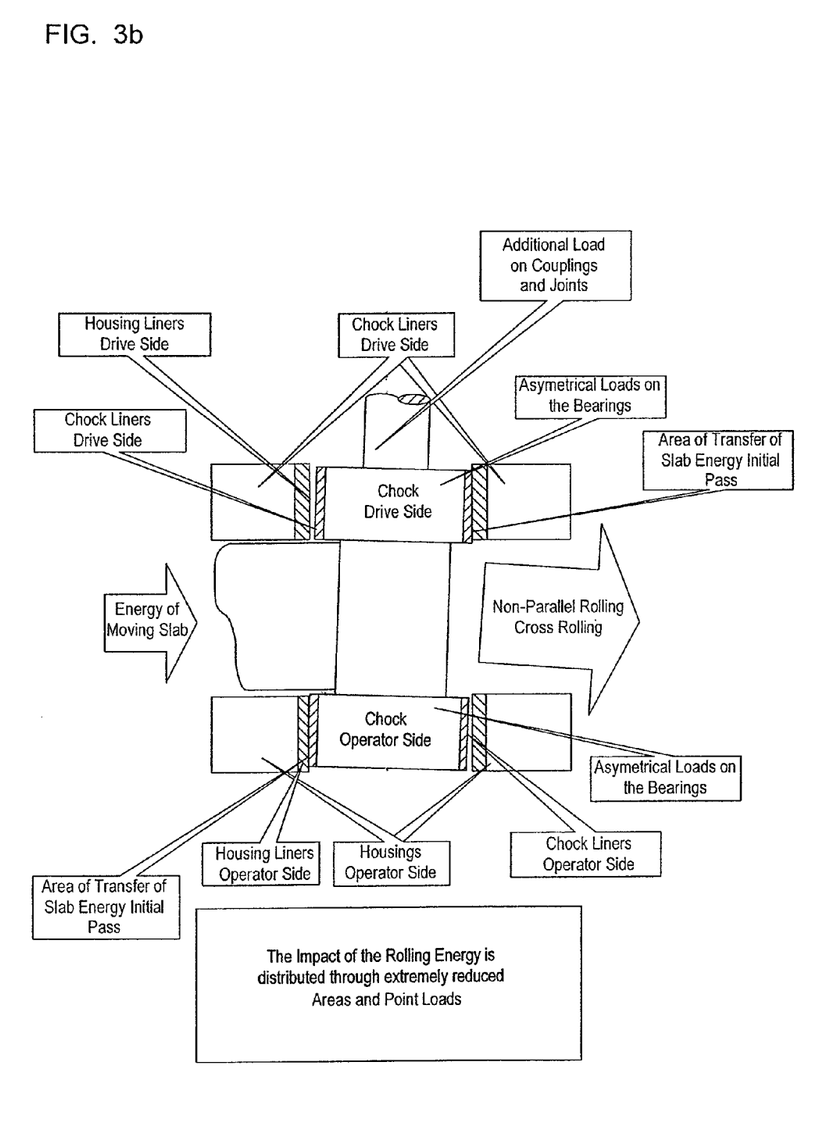

A mill stand incorporating worn linear bearings is shown in FIG. 3*a*. The mill stand of FIG. 3*a* depicts the bearing components in a worn condition. In such a condition, the impact of the slab into mill stand is dispersed across a relatively small portion of the chock liner surfaces, creating "point loads." Point loads can undesirably lead to localized mechanical failure. FIG. 3*b* is a top view depiction of the mill stand of FIG. 3*a* showing a non-parallel slab defect caused by worn liners.

Figure 4:
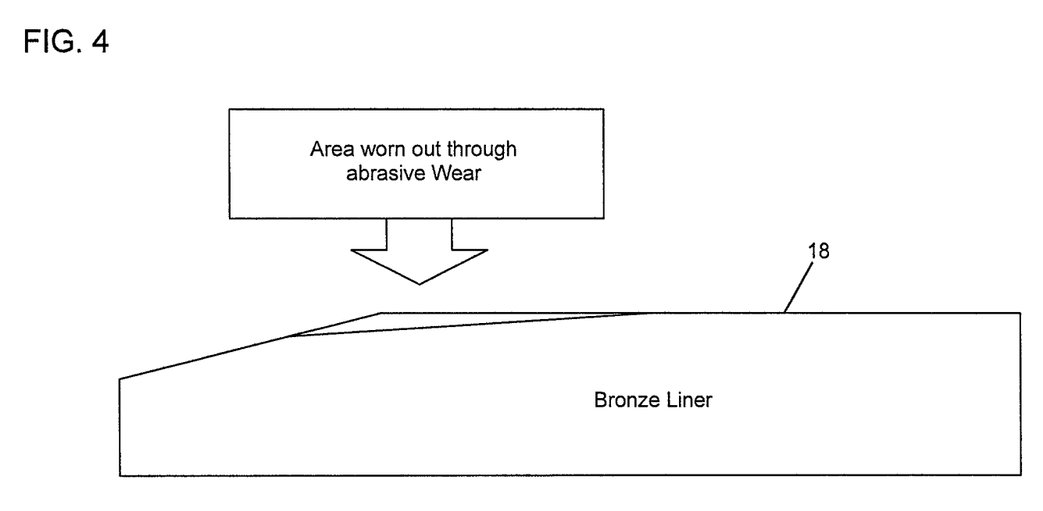
FIG. 4 illustrates a typical wear pattern of a liner plate.

FIG. 4 is a depiction of edge wear on a bronze liner plate. During use of the liners, significant edge wear can also be caused by contact during the roll exchange procedure.

Figure 5:
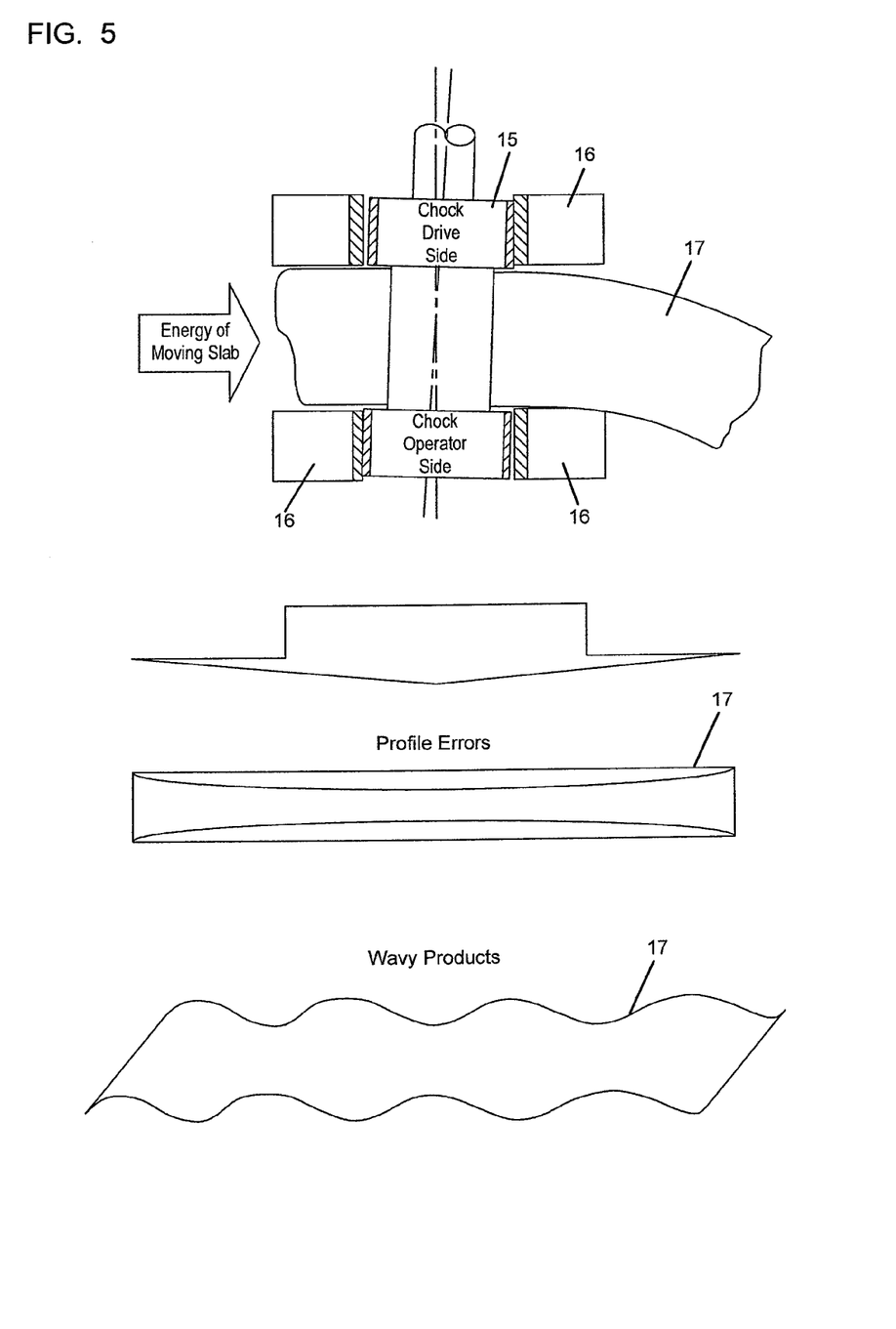
FIG. 5 illustrates poor quality yield of a worn mill stand.

FIG. 5 depicts results of non-rectangular rolling due to worn. Profile errors are found in the products as manifested by waves, crowns, chatter marks and other defects. Product manufactured with such flaws yields a significantly lower price per ton. Similarly, the economic consequences of non-rectangular rolling due to increased liner clearances are significant. Profile and other defects yield lower quality products, increased scrap and shutdowns, increased maintenance costs, all yielding a substantial reduction in product price.

Figure 6:
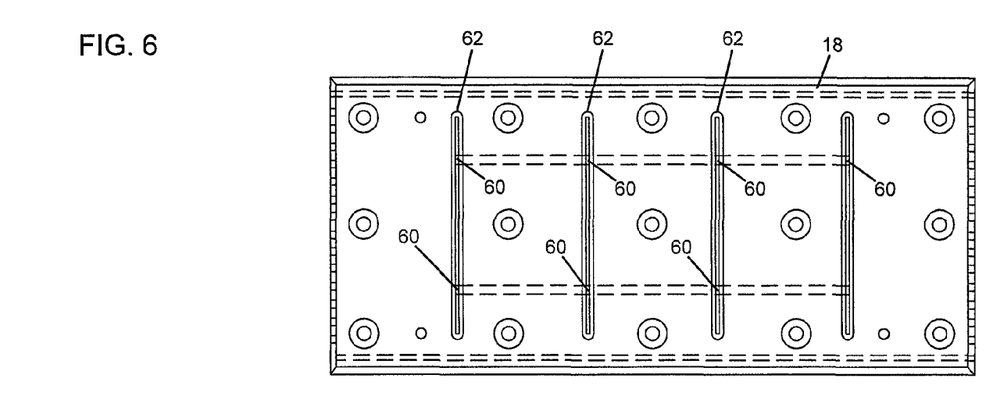
FIG. 6 is a plane view of a liner plate adaptable for use with the mill stand of FIG. 1.
Figure 7:
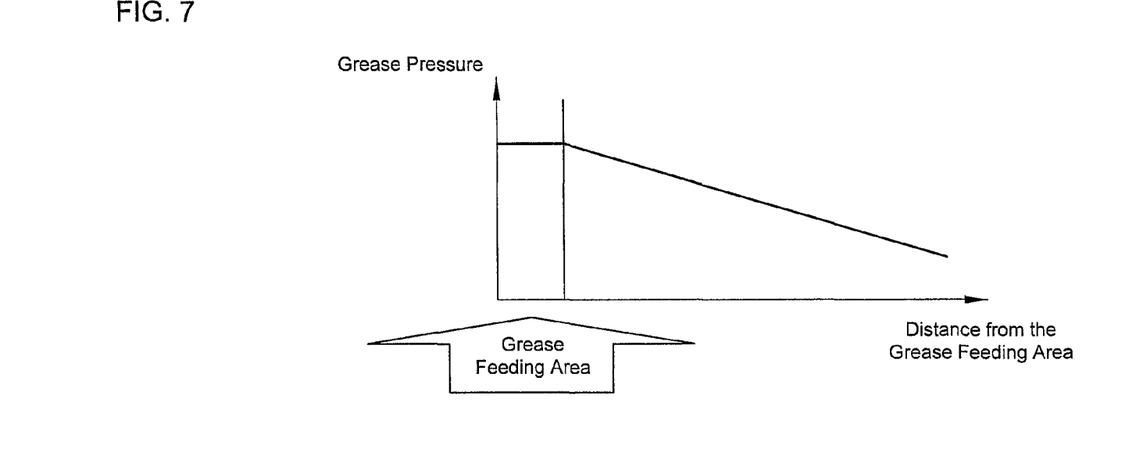
FIG. 7 is a graph showing a relationship between grease pressure and a distance from a grease outlet port on a liner plate.
Figure 8:
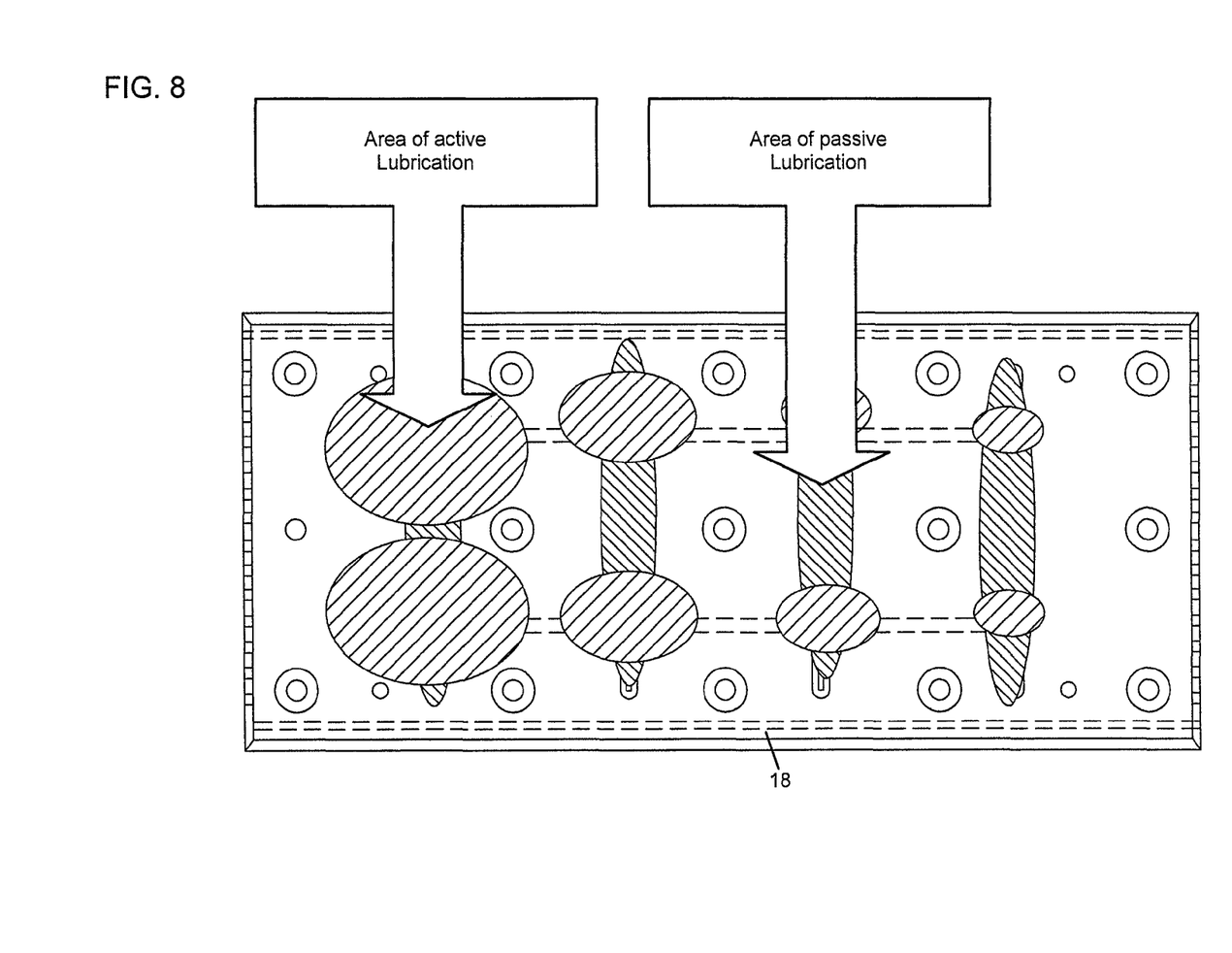
FIG. 8 illustrates areas of active and passive lubrication on a liner plate.

A liner 18 incorporating aspects of a lubrication system of the present invention is shown in FIG. 6. Pressurized lubricant exits ports 60 within the grooves 62 during operation and is conveyed across portions of the liner surface. A substantial reduction in the coefficient of friction can be obtained using such a lubrication system. As shown in FIG. 7, grease pressure decreases outside of the grease feeding area as the distance from the grease feed aperture increases. FIG. 8 illustrates areas of active lubrication and passive lubrication for a liner 18 used in accordance with the present invention.

Figure 9:
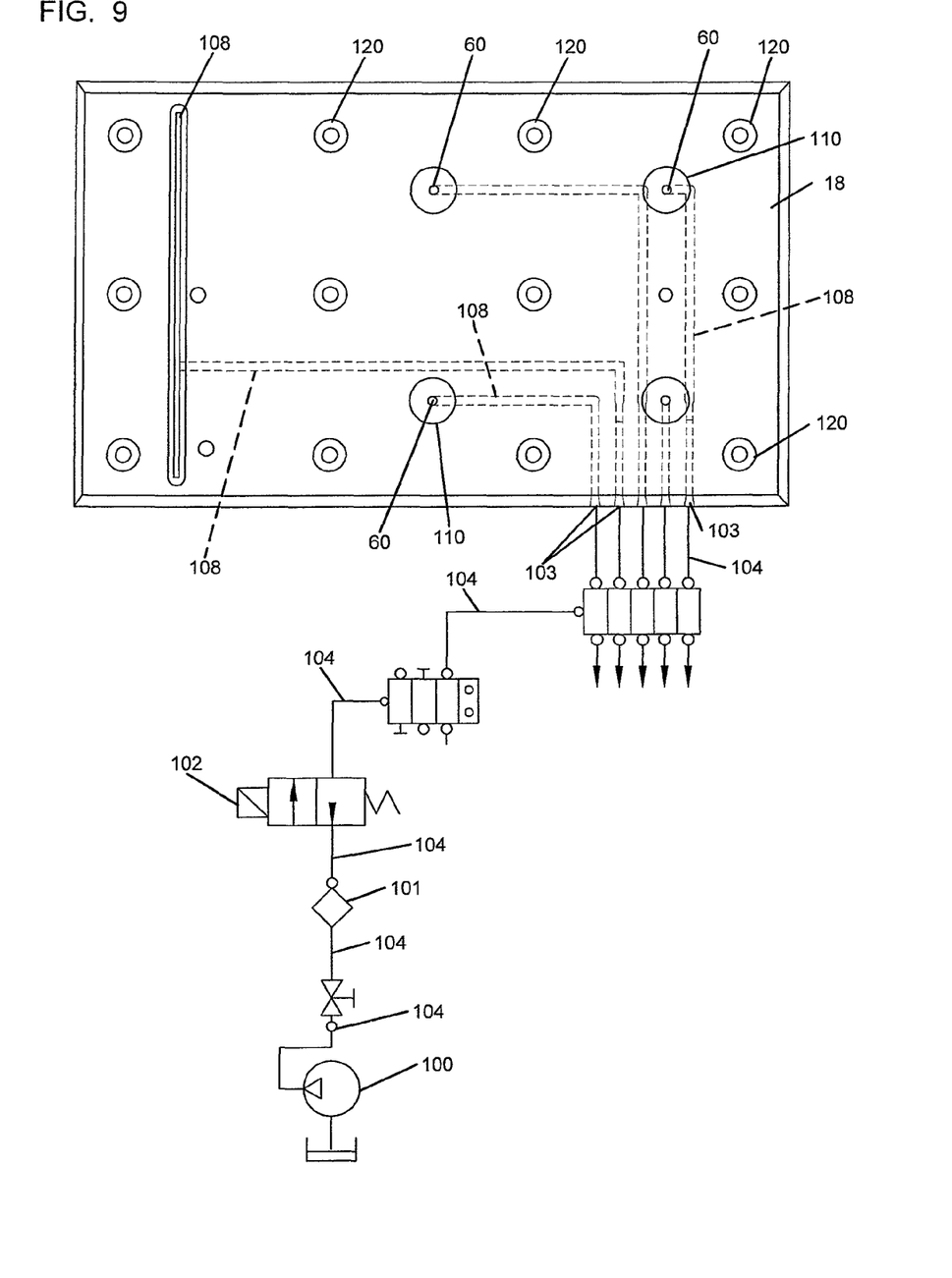
FIG. 9 illustrates a system for supplying lubricant to a liner plate.

An embodiment of lubrication system components for delivery of lubrication to a liner 18 is shown in FIG. 9. A pump 100 directs pressurized lubricant through filter 101 via conduit 104 and through fluid control valves 102 for delivery to liner inlet ports 103. Pressurized lubricant is directed through liner 18 via a plurality of conduits 108. The conduits 108 may be defined by a plurality of channels, machined or otherwise formed in the back or front surface of the liner 18. Once installed on the housing 16, the channels cooperate with a surface of housing 16 (or chock set) to define a plurality of closed conduits for feeding lubricant to the plurality of ports 60. Inlet port 103 is shown on the side of the liner 18, though in alternative embodiments an inlet port may exist on other surfaces of the liner.

Figure 10:
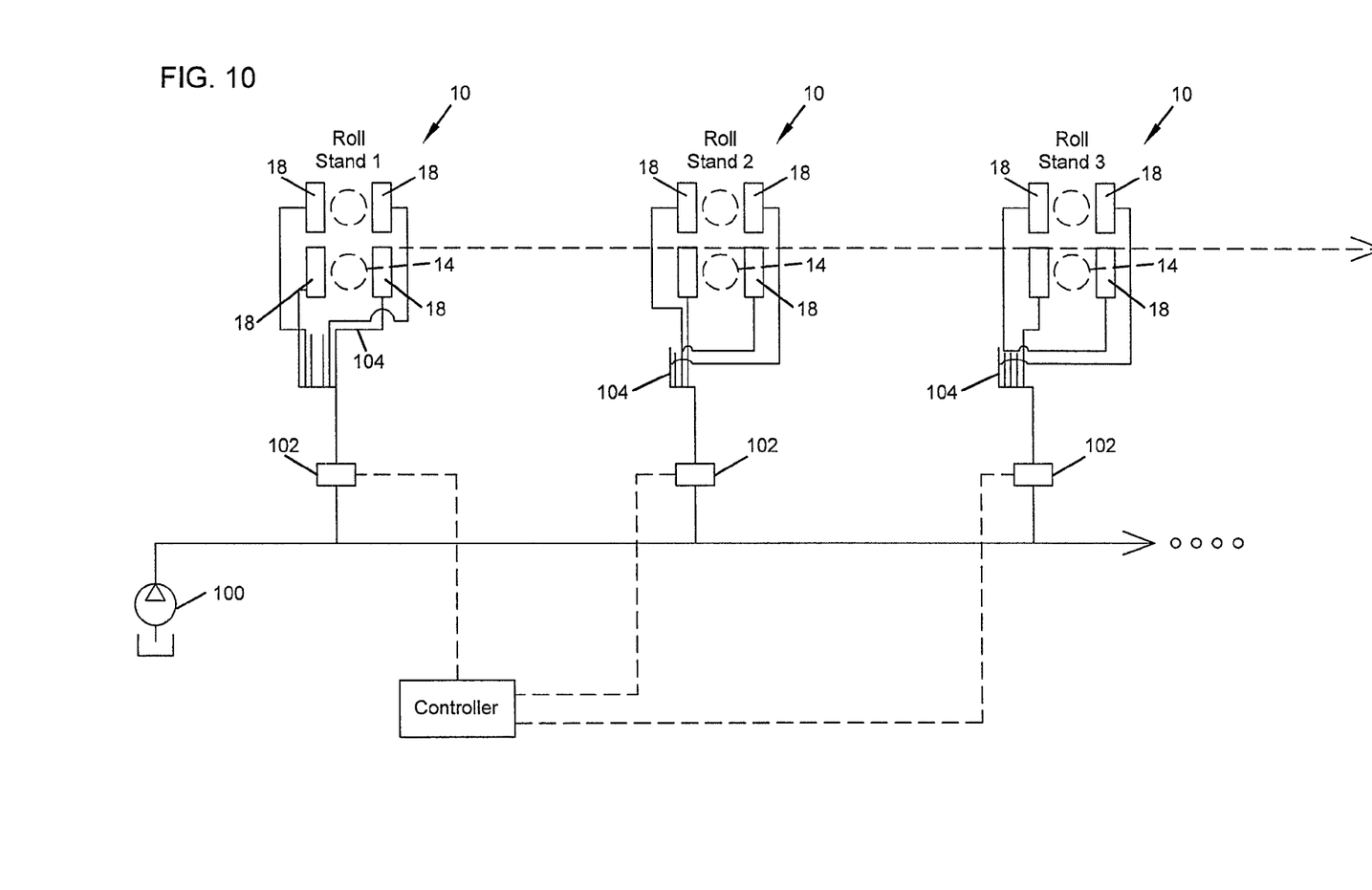
FIG. 10 illustrates a rolling facility having a plurality of mill stands and a centralized lubrication system.
Figure 11:
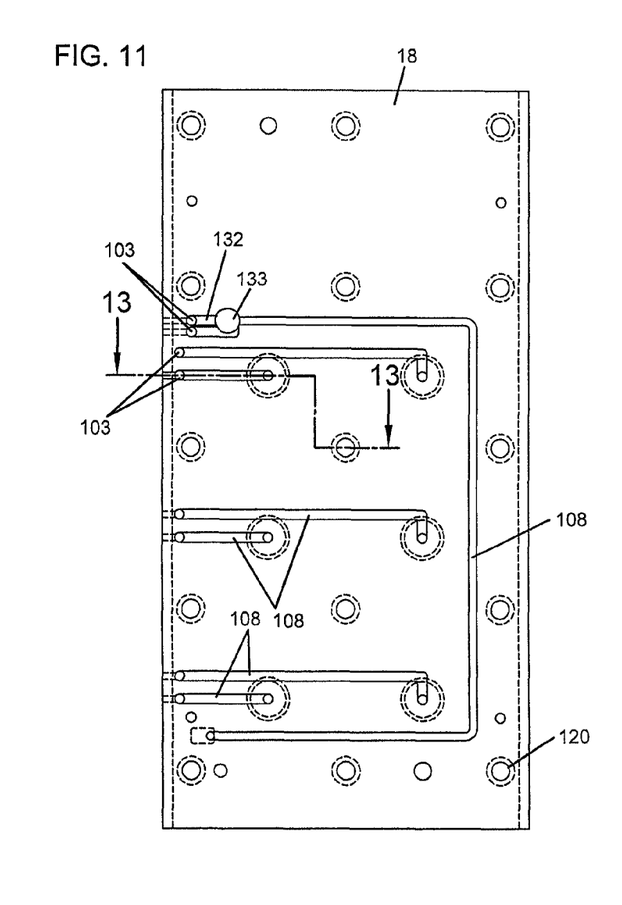
FIG. 11 is a plan view of one side of a liner plate in accordance with the present invention.
Figure 12:
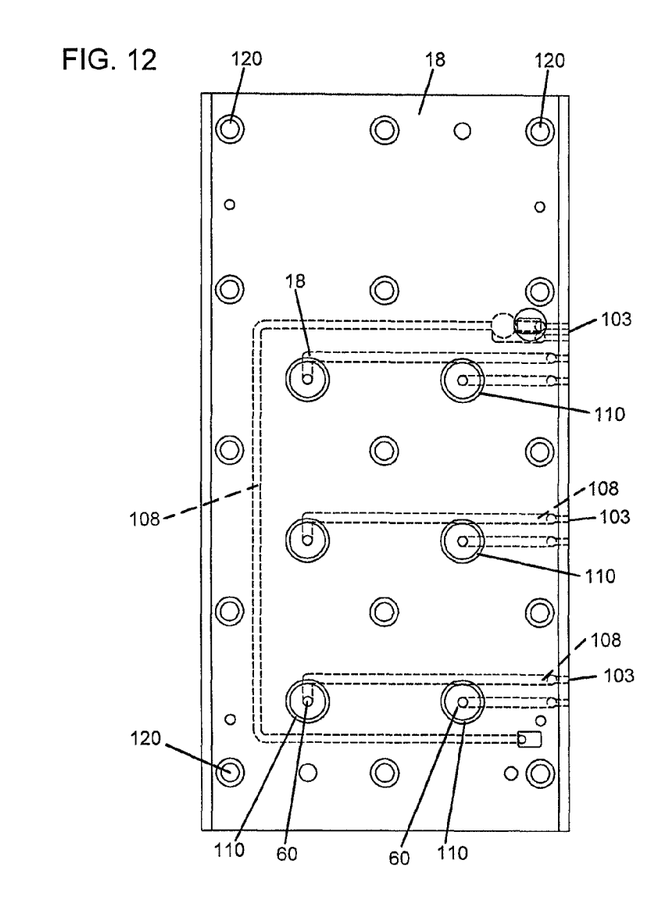
FIG. 12 is a plan view of the other side of the liner plate of FIG. 11.
Figure 13:
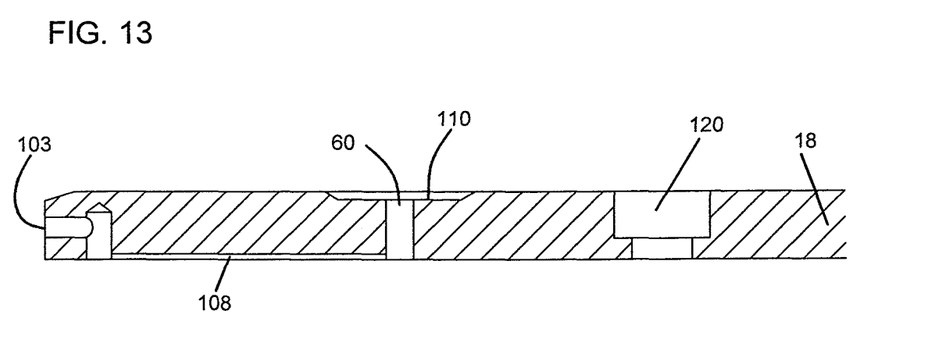
FIG. 13 is a cross-sectional view taken along lings A-A of FIG. 11.
Figure 14:
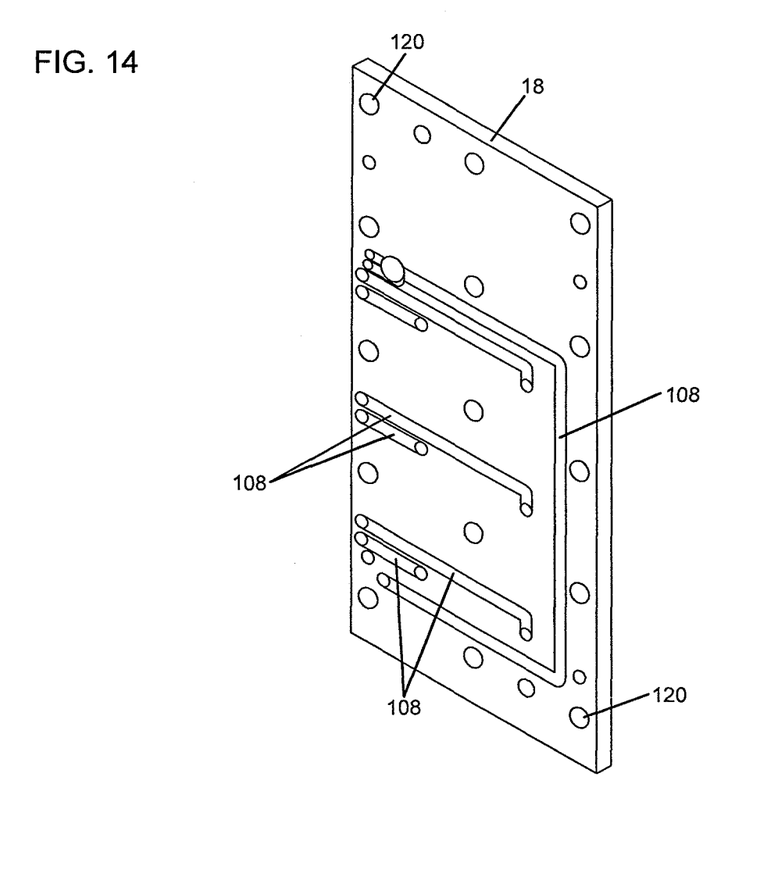
FIG. 14 is a perspective view of the liner plate of FIG. 11.

Additional aspects of a centralized lubrication system in accordance with the present invention are shown in FIG. 10. A central lubrication system provides a lubricating film between the surfaces of liners 18 of a plurality of roll stands 16, achieving a reduction of the temperature inside the liner, and limiting entry of cooling water or other contaminants into the bearing.

During operation, a centralized pump 100 and flow controls 102 may be controlled via a controller to distribute lubrication to various liners 18 within a facility. While the embodiment of FIG. 10 shows a single lubricant source, alternative systems may utilize multiple different lubricants and provide different lubricants to different liners within the facility or at different times during a rolling campaign. In another example, a plurality of lubricant point sources may be positioned in the immediate vicinity of given mill stands. For example, a 55 gallon drum of a lubricant may be associated with one mill stand to supply a predetermined lubricant to the liner surfaces. A pump 100 feeds the lubricant directly, or via a distribution block to the liners 18. An oil film is thus formed from the fed lubricant. Benefits of a centralized lubricant system include a reduction in lubricant consumption, prolonged anti-friction bearing life, a reduction in disposal and maintenance costs, and precise metering of lubricant.

FIGS. 11-14 show a liner plate 18 used in accordance with the present invention. The liner plate 18 includes a plurality of apertures 120 for securing the liner 18 to a housing 16 and a plurality of apertures 106 for emitting lubricant. The lubricant apertures 106 are connected to an internal conduit 108 to an inlet port, here shown located at the side of the liner 18.

The lubrication-carrying conduits 108 may be associated with a single lubricant port 60 or may be associated with more than one lubricant port 60. The lubricant ports include a cup-shaped generally cylindrical depression 110 suitable to contain a volume of lubricant during use. One benefit of the distributed lubricant ports 60 is an equalization of pressure across the liner 18 surface during operation. By maintaining equalized pressure, uneven wear of the liner 18 surface can be minimized. In other embodiments, the depression 110 may be non-cylindrical and assume another shape or form. The plurality of depressions 110 on a liner 18 may vary. For example, in some regions of the liner 18 the depressions 110 may be larger or smaller than other depressions 110 on the liner.

The internal conduits may be formed by a machining operation whereby a channel is cut into the surface of the liner plate. In operation, the channel and a portion of the an adjacent liner together define a generally closed conduit capable of controlling the flow of lubricant toward the lubricant outlet ports.

As described above, lubricant is introduced into the liner 18 via inlet ports. These ports may be fed by a pressurized distribution system as described above. The same lubricant may be introduced into the inlet ports or different lubricants can be introduced in different inlet ports.

In one embodiment of the present invention, a single liner 18 includes a plurality of lube inlet ports 103 with the ports 103 receiving a different lubricant or the same lubricant at different pressures. It is envisioned that a liner 18 may be supplied with lubricant at different pressures so as to equalize the flow of lubricant through outlet ports 60. Alternatively, a liner 18 may have an internal pressure compensating or flow restricting structure so as to control the flow of lubricant out of the outlet ports and allowing for an equalized or other flow of lubricant. In this manner, the roll facility would be able to maintain proper lubrication without excessive waste of lubricant. In another embodiment, a controller could be utilized to vary the quantity or type of lubricant to a liner 18 during a rolling campaign, etc. Again, the ability to control the flow of lubricant could yield substantial savings.

The liner plate of FIGS. 11-14 also show a sensor wire conduit 132 extending across a portion of the liner 18 surface. A sensor wire (not shown) is received within the conduit 132 and is connected at one end to a sensor and to a connector at another end. The sensor may be a gap sensor 133 for determining a displacement between the liner plate and another surface.

Figure 15:
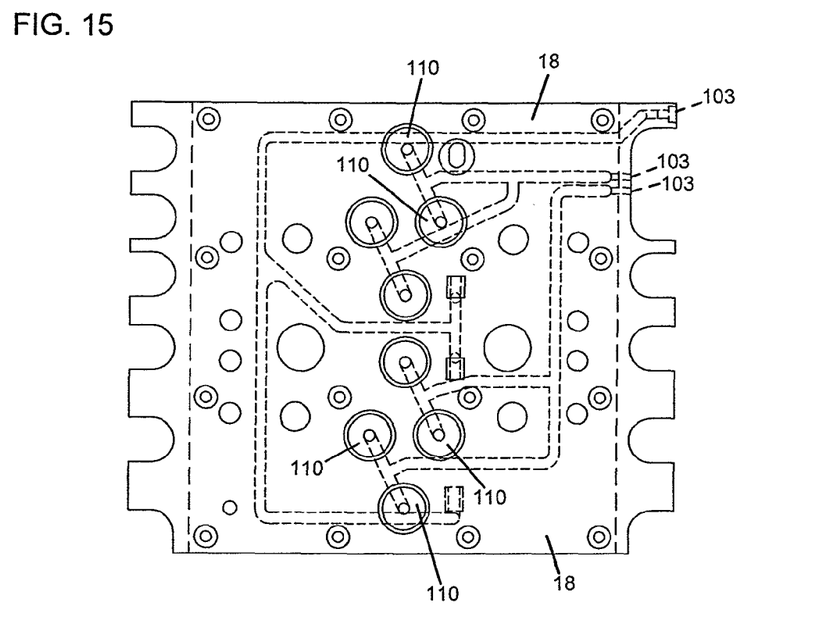
FIG. 15 is a plan view of one side of another embodiment of a liner plate in accordance with the present invention.
Figure 16:
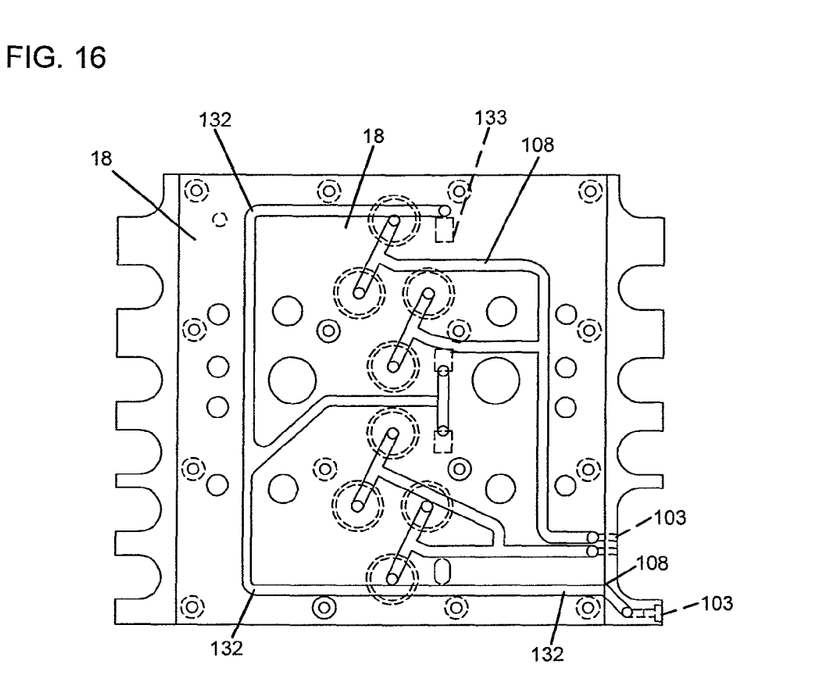
FIG. 16 is a plan view of the other side of the liner plate of FIG. 15.
Figure 17:
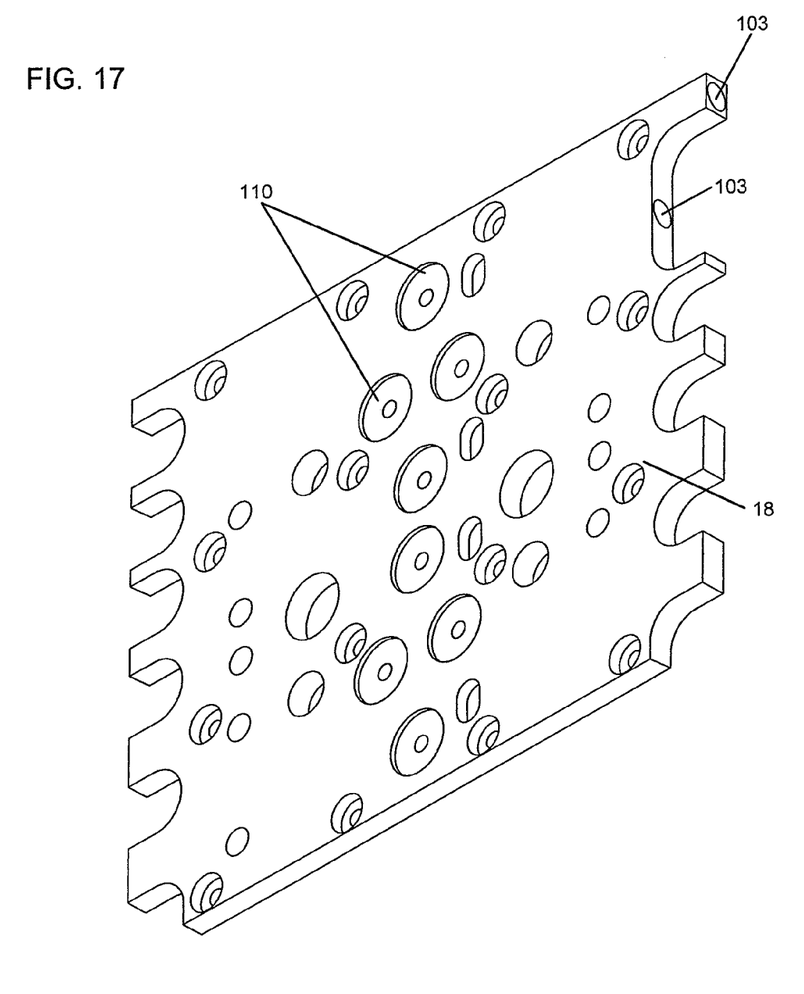
FIG. 17 is a perspective view of the liner plate of FIG. 16.

FIGS. 15-17 show another embodiment of a liner plate 18 adaptable for use within a system in accordance with the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A lubricant delivery system for a rolling facility comprising:
    a roll stand having work rolls, movable chock sets supporting the work rolls, and stationary housing liners engaging the chock sets, and each of said housing liners having a generally planar bearing surface which engages a generally planar bearing surface of one of the chock sets during a rolling campaign, each of said housing liners having a generally planar support surface opposite the bearing surface which is secured against a generally planar surface of the roll stand, and a plurality of apertures extending through the housing liners with fasteners adapted to extend through the apertures to secure the housing liners to the roll stand, and said housing liners having a plurality of conduits on the planar support surface providing fluid communication between at least one outlet port at the bearing surface and at least one inlet port; and
    a pressurized lubricant in fluid communication with said at least one inlet port, with said pressurized lubricant passing through the plurality of conduits and being expelled out of said at least one outlet port to provide lubrication to each housing liner.

2. The lubricant delivery system of claim 1 further comprising a control device for selectively controlling a flow of the pressurized lubricant through a plurality of external conduits.

3. The lubricant delivery system of claim 1 wherein said at least one inlet port includes a plurality of inlet ports at a side of the housing liner between the bearing surface and the support surface.

4. The lubricant delivery system of claim 2 further comprising a pump which is controlled via a controller to supply the lubricant.

5. The lubricant delivery system of claim 1 wherein the at least one outlet port includes a generally cylindrical depression on the bearing surface.

6. The lubricant delivery system of claim 5 wherein a diameter of the generally cylindrical volumes is substantially greater than a width of the plurality of conduits.

7. The lubricant delivery system of claim 1 having a plurality of lubricant inlet ports with different lubricant inlet ports being in fluid communication with different outlet ports of the liner.

8. The lubricant delivery system of claim 1 further comprising a sensor wire conduit extending across a portion of the planar support surface of the housing liner.

9. The lubricant delivery system of claim 8 further comprising a gap sensor for determining displacement between the housing liner and the chock set.

10. The lubricant delivery system of claim 9 further comprising a sensor port on a side of the housing liner between the support surface and the bearing surface.

11. The lubricant delivery system of claim 1 wherein the plurality of conduits comprise a plurality of grooves on the planar support surface.

12. A lubricant delivery system for a rolling facility comprising:
    a roll stand having work rolls, chock liners and housing liners, with said housing liners having generally planar bearing surfaces which engage generally planar bearing surfaces of the chock liners during a rolling campaign, with each of said housing liners having a generally planar support surface opposite the bearing surface which is secured against a generally planar surface of the roll stand, and a plurality of apertures extending through the housing liners with fasteners adapted to extend through the apertures to secure the housing liners to the roll stand, and said housing liners having a conduit defined on the planar support surface to provide fluid communication between a lubricant outlet port at the bearing surface and an inlet port at a side of each housing liner between the bearing surface and the support surface, and with a pressurized lubricant being introduced into the inlet port and passing through the conduit and being expelled out of said lubricant outlet port to provide lubrication to the housing liners.

13. The lubricant delivery system of claim 12 wherein the lubricant outlet port is a generally cylindrical volume.

14. The lubricant delivery system of claim 13 wherein a width of the conduit is substantially smaller than a diameter of the cylindrical volumes.

15. The lubricant delivery system of claim 12 further comprising a sensor wire conduit extending across a portion of the planar support surface of the housing liner.

16. The lubricant delivery system of claim 15 further comprising a gap sensor for determining displacement between one of the housing liners and one of the chock liners, with said gap sensor being positioned at the bearing surface of the housing liner.

17. The lubricant delivery system of claim 16 further comprising a sensor port on a side of the housing liner between the support surface and the bearing surface, with a sensor wire passing through the sensor port.

* * * * *